United States Patent [19]
Eckert

[11] 3,937,242
[45] Feb. 10, 1976

[54] PRESSURE CONTROL DEVICE FOR CONTROLLING THE FLOW OF A FLUID MEDIUM

[75] Inventor: Konrad Eckert, Stuttgart, Germany

[73] Assignee: Robert Bosch G.m.b.H., Stuttgart, Germany

[22] Filed: Sept. 12, 1973

[21] Appl. No.: 396,527

[30] Foreign Application Priority Data

Sept. 22, 1972 Germany............................ 2246476

[52] U.S. Cl. ............ 137/102; 137/625.65; 251/129
[51] Int. Cl.² ........................................ F16K 31/04
[58] Field of Search.......... 137/102, 625.65, 625.27, 137/596.17; 251/129

[56] References Cited
UNITED STATES PATENTS

| | | | |
|---|---|---|---|
| 2,435,076 | 1/1948 | Hall ................ | 137/596.17 |
| 3,001,549 | 9/1961 | Nelson ............. | 137/625.27 |
| 3,022,799 | 2/1962 | Padula ............. | 137/625.15 |
| 3,529,620 | 9/1970 | Leiber............... | 251/129 X |
| 3,828,818 | 8/1974 | Hunt................. | 137/625.65 |

*Primary Examiner*—Alan Cohan
*Attorney, Agent, or Firm*—Edwin E. Greigg

[57] ABSTRACT

A pressure control device for a flowing fluid medium is described which comprises a fluid inlet conduit structure and a fluid return conduit structure each of which conduit structures has a valve seat; a connecting structure for linkup with a fuel consuming device; and a movable valve member for controlling the cross sectional area of the outflow of fluid from the control device, wherein the movable valve member which is arranged between the valve seats of the inlet and return conduit structures, controls the cross sectional areas of flow through the inlet conduit structure and the return conduit structure, respectively, in opposite sense and is biased by a resetting force, and wherein the valve seat cross sectional area of the return conduit structure is smaller than that of the inlet conduit structure, whereby a force resulting from the inlet fluid pressure and the cross sectional flow area of the inlet conduit structure acts on the movable valve member in a direction causing reduction of fluid influx and is opposed by the resetting force as well as by a force resulting from the fluid pressure in the connecting structure and from the area difference between the valve seat across sectional areas of the inlet and the return conduit structures. The movable valve member is preferably a membrane, and an electromagnet or spring structure may be used to provide the resetting force.

12 Claims, 2 Drawing Figures

PRESSURE CONTROL DEVICE FOR CONTROLLING THE FLOW OF A FLUID MEDIUM

BACKGROUND OF THE INVENTION

This invention relates to a pressure control device adapted for regulating the flow of a fluid medium and having fluid inlet conduit means, fluid return conduit means and a connecting means for link-up with a fluid consuming device, as well as a movable valve member which controls the cross sectional area of the fluid outlet; this device is particularly adapted for the regulation of the control fluid of a fuel metering device for internal combustion engines.

Such pressure control devices are required to regulate very rapidly, but also to afford a high quality, i.e., very accurate regulation even at small pressure differences. Moreover, they should be capable of regulating pressures down to zero. In the known control devices initially described the fluid inlet conduit means comprise a throttle, and the pressure on the side of the consuming device is regulated by a control of the fluid outflow cross sectional area. These known systems suffer from the drawback of having a continuous outflow of oil at smallest and medium pressures; furthermore, they do not permit regulation of the pressure in the return conduit means down to zero, since, in order to permit this, no resistance at all should occur in the return conduit. Moreover, the regulating time required for such devices is relatively long, as there must be maintained a continuous influx of liquid via the fluid inlet conduit means.

OBJECTS AND SUMMARY OF THE INVENTION

It is an object of the invention to provide a pressure control device of the initially described type, which fulfills the above-mentioned requirements and avoids the mentioned drawbacks.

This and other objects are attained in accordance with the invention in a pressure control device adapted for regulating the flow of a fluid medium and comprising a housing having fluid inlet and return conduit means therein each of which conduit means comprises a valve seat, connecting means for link-up with a fluid-consuming device, a movable valve member being adapted for controlling the cross sectional areas of flow through the inlet and return conduit means in an opposite sense, and biasing means for applying a resetting force to the movable member in a direction causing reduction of fluid influx; wherein the movable member is arranged between the valve seats of the inlet and return conduit means and wherein the valve seat cross sectional area of the return conduit means is smaller than that of the inlet conduit means, whereby a force resulting from the inlet fluid pressure and the cross sectional flow area of the inlet conduit means acts on the movable valve member and is opposed by the resetting force as well as by a force resulting from the fluid pressure in the aforesaid connecting means and from the area difference between the valve seat cross sectional areas of the inlet and return conduit means. Thus, the cross sectional flow area of the inlet conduit means decreases as the fluid-consuming device pressure increases, and viceversa.

In an advantageous embodiment of the invention, the aforesaid biassing means comprise a solenoid which provides the resetting force, and whereby the latter force is adjustable to the hydraulic pressures prevailing in the device. When, for instance the fluid pressure in the inlet conduit means changes, it becomes necessary to increase the resetting force when the fluid-consuming device pressure is to remain constant; this can be achieved by increasing the magnetic forces of the solenoid.

In another advantageous embodiment of the device according to the invention, the resetting force is provided by a spring which is adjusted to maintain the movable valve member in a state of equilibrium between the two above-mentioned valve seats.

According to yet another advantageous embodiment of the invention, means are provided whereby the resetting force can be changed by an adjusting force which may be provided by another spring or by a solenoid. Preferably, this adjusting force will also act on the movable valve member. Preferably the resetting force and the adjusting force can both be provided by springs, or one of them by a spring and the other by a solenoid, or both may be provided by solenoids; either a spring or a solenoid providing the resetting force, and another spring or solenoid supplying the adjusting force for varying the regulation.

In a further, preferred embodiment of the device according to the invention, the movable valve member is constituted by a control membrane which is clamped-in and extends across the interior of the housing in a plane which either coincides with the plane through one of the two valve seats, or which extends between those planes in which the two valve seats are located. Apart from the advantage that a membrane operates practically free from hysteresis, the flat valve seat having an annular cross sectional area for the passage of fluid therethrough affords, at short strokes of the membrane, a linear relationship between the membrane stroke and the aforesaid passage cross sectional area.

Finally, according to a further embodiment of the invention, one of the two valves constituted by the membrane and the two valve seats can be devised as a flat seat valve and the other as a ball valve. Furthermore, it can be advantageous to suspend the movable valve member from at least one guiding membrane in an axially displaceable manner, whereby a safe obturation of the device is guaranteed even at varying loads.

The invention will be better understood, and further objects and advantages will become apparent from the ensuing detailed specification of preferred but merely exemplary embodiments taken in conjunction with the drawings.

DETAILED DESCRIPTION OF THE EMBODIMENTS

Figure 1:
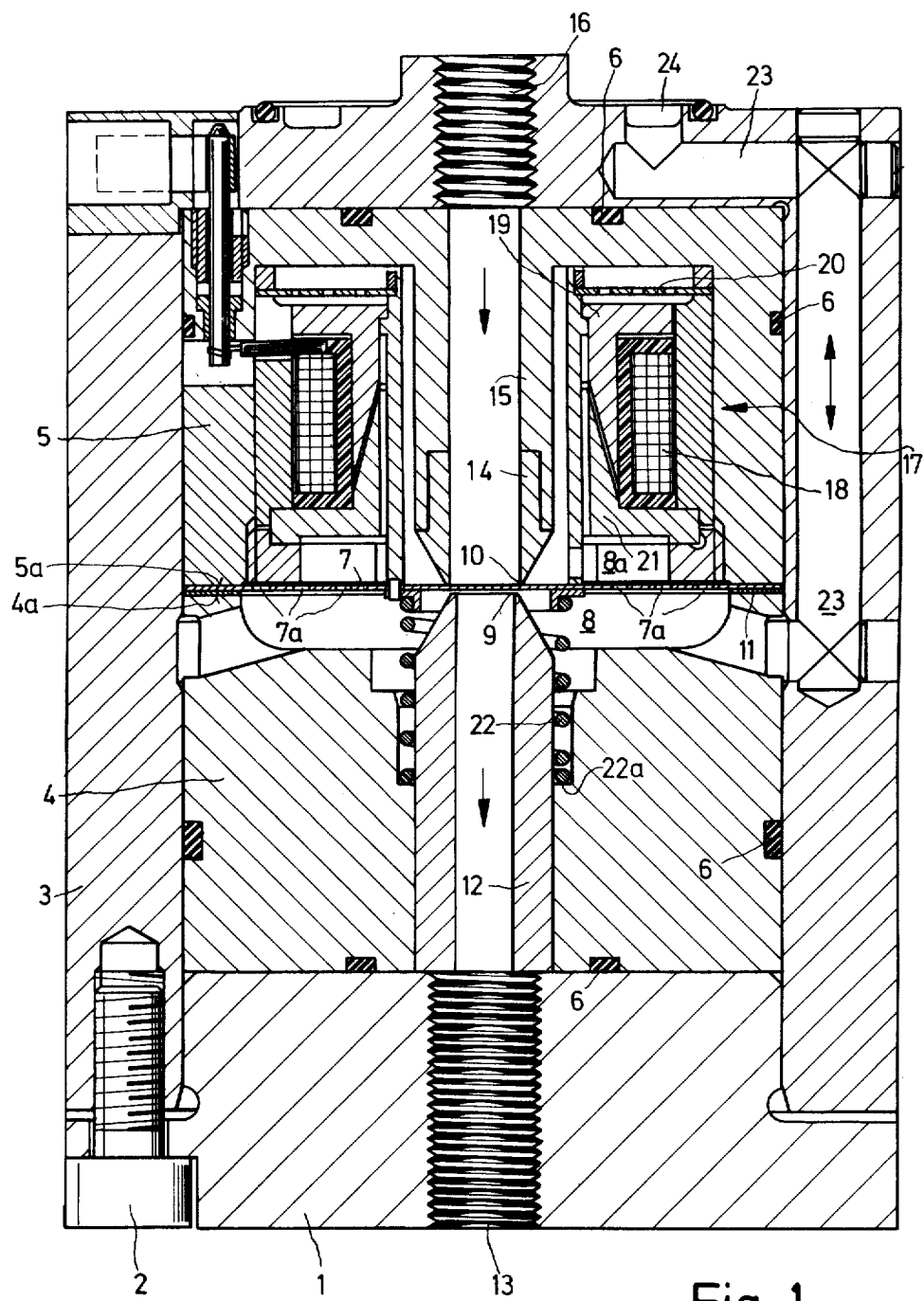
FIG. 1 shows, in axial sectional view, a first embodiment of the pressure control device according to the invention, being constituted by a membrane regulator.

Between a base plate 1 and a cup- or hat-shaped cover 3 which is fastened on base plate 1 by means of screws 2, there are arranged an internal bottom member 4 and an internal top member 5, the outer faces of which are hermetically sealed against the inner walls of base plate 1 and cover 3 by means of sealing rings 6 which are placed in corresponding annular top and bottom grooves and annular peripheral grooves in the outer walls of members 4 and 5. In the faces of members 4 and 5 turned toward each other, these members bear cavities 8 and 8a, and between the peripheral frontal faces 4a and 5a of these members there is clamped-in a membrane 7 which extends across the hollow interior of members 4 and 5 and separates cavities 8 and 8a from one another. Free communication is established between these cavities by way of apertures 7a provided in membrane 7. In a central bore of bottom member 4 there is force-seated a sleeve member 12 which extends to the vicinity of membrane 7 and bears at its end adjacent the latter a valve seat 9. Similarly a tubular sleeve 15 projects from the central top wall of member 5 into the cavity 8a and bears at its free end adjacent membrane 7 a valve seat 10. The end part 14 of sleeve 15 bearing valve seat 10 is preferably of different material and is press-fitted into a recess in the end face of sleeve 15.

In the embodiment shown in FIG. 1 membrane 7 sealingly contacts valve seat 10 when in a non-actuated position; thus, the maximum stroke of membrane 7 is equal to the distance between membrane 7 on valve seat 10, and valve seat 9. Valve seat 9 and the frontal face 4a of housing member 4 are arranged in the same plane, and valve seat 10 and frontal face 5a of member 5 are also arranged in a common plane, so that each valve seat and frontal face pair can be given a finish in a single working phase. Annular washers 11 are interposed at least on one side of membrane 7 between the latter and the adjacent frontal face, which in FIG. 1 is face 4a of member 4. Washers 11 have the same width as the frontal face on which they are placed and determine the stroke of membrane 7.

Sleeve 15 registers with a bore 16 in the top wall of cover 3 serving as inlet conduit for the regulating fluid medium, while sleeve member 12 registers with central bore 13 in base plate 1 and thus forms part of the return conduit for fluid medium. In cavity 8a there is arranged spacedly about sleeve 15 a solenoid 17 consisting of exciter winding 18, magnetic core 19 and an armature 21 of which opposite faces of core 19 and armature 21 are of frustoconical shape and extend parallel to each other. Armature 21 is suspended from an annular membrane 20 which is clamped-in at its periphery between magnetic core 19 and the interior wall of cavity 8a. Armature 21 acts through the sleeve 41 upon membrane 7 and against the bias of a resetting spring 22 which is supported at its one end on a shoulder 22a formed by a central recess about sleeve 12 in the face of member 4 turned toward membrane 7. The magnetic core 19 is fastened into assembly with the remaining parts of the solenoid 17 by a ring 42. The force of solenoid 17 corresponds to the current intensity applied to exciter coil 18 due to the fact that the rising characteristic remaining on account of the frustoconical shape of the armature face opposing the magnet core is balanced by the rising characteristic of spring 22.

The chambers constituted on both sides of the membrane 7 by the spaces of cavities 8 and 8a outside valve seats 9 and 10 are connected to a fluid-consuming device by way of a bore 23 extending axially in the wall of cover 3 and opening out of the latter in an annular groove 24 to which a flange (not shown) of the consuming device can be connected.

The diameter of valve seat 10 is larger than that of valve seat 9 so that as a result of the difference in valve seat areas, a force will act in the direction towards valve seat 10 on the membrane 7. This force depends on the pressure prevailing in the chambers of cavities 8 and 8a and on the difference between the valve seat areas and is augmented by the force of spring 22. Theoretically and in practice, the most favorable result is obtained when the valve seats on the inlet and the return flow side have a cross sectional ratio of 9:25, or, in the case of round seats a diameter ratio of 3:5. In the latter case, there would occur a "self-regulation" by means of spring 22 whose rigidity would be negligible and at an assumed membrane rigidity of zero, even when no solenoid is employed; such regulation is effected by a control fluid flowing past valve seat 10 into the chamber of cavity 8a surrounding the valve seat until a pressure is attained in that chamber which would act in correspondence with the difference between the annular faces of valve seats 9 and 10 and urging the membrane 7 toward valve seat 10, thereby controlling the influx of fluid medium through sleeve 15. At the same time, the return flow of fluid medium through sleeve 12 would be increased as the membrane 7 would move away from valve seat 9. Thus membrane 7 is displaced between valve seats 9 and 10 endeavoring to maintain a constant fluid pressure in spaces 8 and 8a. As soon as there is a change in the pressure of the fluid-consuming device, the previously prevailing pressure will be re-established in chambers 8 and 8a. Depending on the current intensity applied to solenoid 17, the pressure prevailing in chambers 8 and 8a can be adjusted to a pressure demanded by the fluid-consuming device. In this case, a control force generated by the solenoid 17 is superimposed on the force acting on membrane 7. In order to avoid that additional forces of adhesion or magnetic forces influence this regulation due to magnetic flux, the valve seat part 14 as well as housing members 4 and 5 are made of non-magnetizable material. Furthermore, the widths of valve seats 9 and 10 are kept narrower than 0.2 mm in order to avoid an abrupt increase in the force acting on membrane 7 at opening.

In another embodiment (not illustrated) of a pressure control device according to the invention, the membrane may itself serve as the armature of the solenoid.

Figure 2:
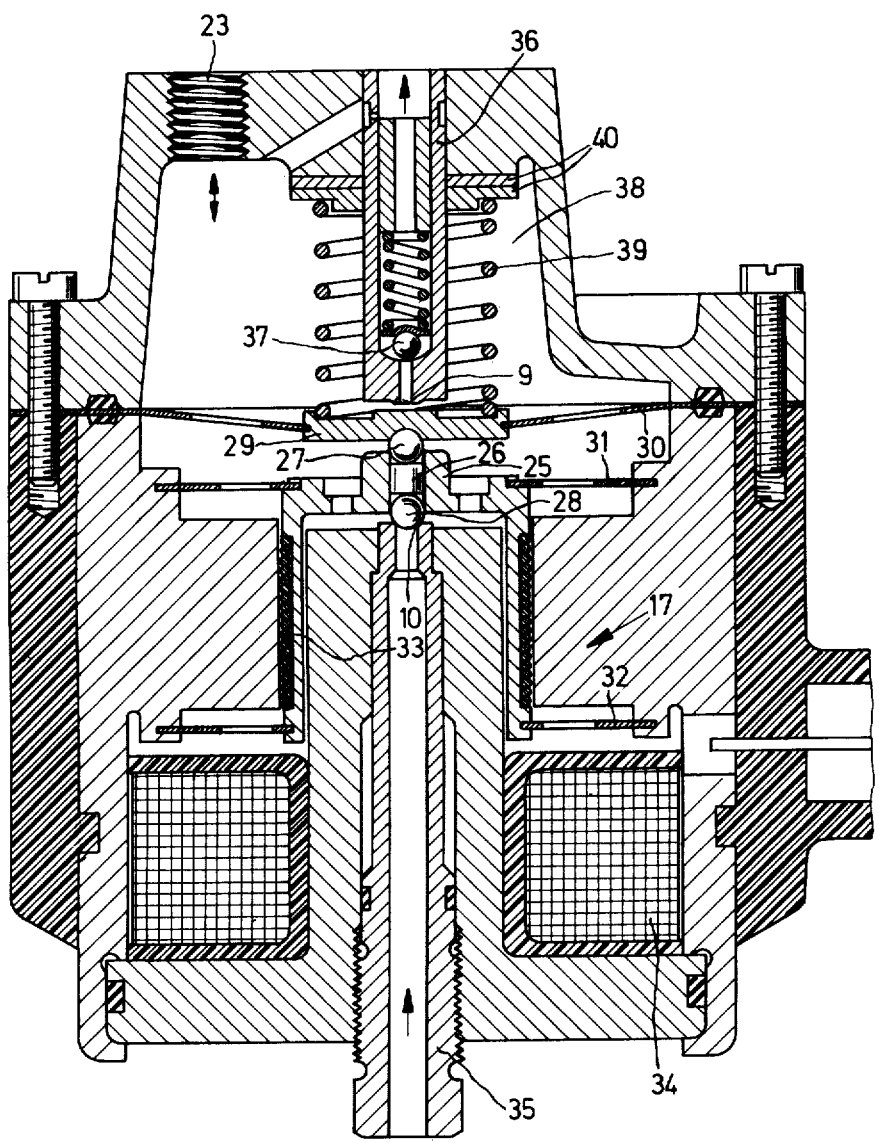
FIG. 2 shows, an axial sectional view, another embodiment constituting a regulator device according to the invention, having combined therein a ball valve and a flat seat valve.

The embodiment shown in FIG. 2 has a similar function as the embodiment shown in FIG. 1, but operates with somewhat different means. As solenoid 17 there is used a moving coil magnetic system having a coil 33 and an armature 25 is the central bore of which there is mounted stopper 26 which serves as a counterbearing for two balls 27 and 28. Ball 28 serves as the obturating member for valve seat 10 which is provided at the inner end of inlet tube 35, while ball 27 acts as an intermediate bearing for a valve plate 29 which cooperates as the movable valve member with the valve seat 9 which is provided at the inner end of tubular member 36. Valve plate 29 as well as armature 25 are suspended for axial displacement and with the maximum possible freedom from friction from guiding membranes 30, 31 and 32, which membranes are affixed at their peripheries in the sidewall of the housing of the pressure control device. Beside the moving coil 33 arranged on armature 25 there is also arranged an exciter winding 34 in the housing, by means of which winding the magnetic flux in magnetic core 19 can be varied. While inlet tube 35 is not equipped with any additional throttling means, the tubular member 36 contains in its bore a spring-biassed ball check valve 37. The provision of check valve 37 ensures that fluid medium is present at all times in chamber 38 of the pressure control device, and that, when fuel is used as the regulating medium, an evaporation of the latter in the case of a hot housing is avoided. The force which is generated by the hydraulic resetting effect due to the difference between the cross sectional area of valve seats 9 and 10 is aided by that of a spring 39 which is supported at its one end on spring retaining discs 40 against the wall of the housing of the device, while the other end of spring 39 is seated on the face of valve plate 28 away from ball 27.

What is claimed is:

1. A pressure control device adapted for controlling the flow of a fluid medium and comprising:
    a housing;
    fluid inlet conduit means in said housing;
    fluid return conduit means in said housing, each of which conduit means comprises a valve seat;
    connecting means for link-up with a fluid consuming device;
    a movable valve member having two operating sides;
    means mounting said movable valve member to said housing between the valve seats of said inlet and return conduit means so that one operating side of the movable valve member is associated with said inlet conduit means and the other operating side of the movable valve member is associated with said return conduit means;
    an inlet cavity operatively associated with said inlet conduit means and defined on said one operative side of said movable valve member;
    a return cavity, operatively associated with said return conduit means and said connecting means and defined on said other operative side of said movable valve member,
    said movable valve member being displaceable for controlling the cross sectional areas of flow through said inlet and said return conduit means, respectively, in an opposite sense; and
    biassing means for applying a resetting force to said movable valve member to reduce fluid influx,
    a solenoid including a magnetic core and an armature between which an excitor winding is disposed, said magnetic core and armature having opposite faces of frustoconical shape which extend substantially parallel to each other, said solenoid being disposed within the inlet cavity and about the inlet conduit sleeve
    means connected to the armature and the movable valve member for transmitting a force to the movable valve member generated by the solenoid, said force serving to adjust the resetting force to the hydraulic pressures prevailing in the device, said last mentioned means comprising an annular sleeve located coaxially within the magnetic core, said sleeve being resiliently supported by an annular membrane connected to the housing
    wherein said fluid inlet conduit means comprises a sleeve which projects into the inlet cavity and which bears one of the valve seats at its free end,
    wherein said fluid return conduit means comprises a sleeve which projects into the return cavity and which bears the other of the valve seats at its free end
    wherein the valve seat cross sectional area of said return conduit sleeve is smaller than that of said inlet conduit sleeve, whereby a force resulting from the inlet fluid pressure in said inlet cavity and the cross sectional flow area of said inlet conduit sleeve and acting on said one operative side of said movable valve member is opposed by said resetting force as well as by a force resulting from the fluid pressure in said return cavity and said connecting means and from the area difference between the valve seat cross sectional areas of said inlet and said return conduit sleeves and acting on said other operative side of said movable valve member thereby achieving a hydraulic resetting effect.

2. A pressure control device as described in claim 1, wherein said biassing means comprises spring means.

3. A pressure control device as described in claim 1, wherein the ratio of the cross sectional area of the valve seat of said inlet conduit sleeve to the cross sectional area of the valve seat of said return conduit sleeve is about 9:25.

4. A pressure control device as described in claim 1, wherein said valve seats are round and the ratio of the diameter of the valve seat of said inlet conduit sleeve to the diameter of the valve seat of said return conduit sleeve is about 3:5.

5. A pressure control device as described in claim 1, wherein said movable valve member consists of a control membrane clamped-in by said mounting means across the interior of said housing in a plane which extends through one of said valve seats.

6. A pressure control device as described in claim 5, wherein said mounting means includes a face of said housing for clampingly engaging said control membrane, and wherein said face extends in the same plane as one of said valve seats so that said face and the respective valve seat can be finished together in a single working phase.

7. A pressure control device as described in claim 5, further comprising shim means for adjusting the distance between the plane in which said control membrane extends and the planes in which said valve seats are located.

8. A pressure control device as described in claim 5, wherein said control membrane has at least one aperture through which free communication is established between the inlet cavity and the return cavity defined in the interior of said housing by said control membrane.

9. A pressure control device as described in claim 1, wherein said movable valve member and the portions of said inlet and return conduit sleeves bearing said valve seats are made of non-magnetizable material.

10. A pressure control device as described in claim 1, wherein said connecting means open into said return cavity in the interior of said housing.

11. A pressure control device as described in claim 1, wherein said movable valve member consists of a control membrane clamped-in by said mounting means across the interior of said housing in a plane which extends between those planes in which said two valve seats are located.

12. A pressure control device as described in claim 1, said biasing means being mounted about said return conduit sleeve.

* * * * *